US009581693B2

(12) United States Patent
Urase (10) Patent No.: US 9,581,693 B2
(45) Date of Patent: Feb. 28, 2017

(54) ULTRASOUND SENSOR (71) Applicant: PANASONIC CORPORATION, Osaka (JP)

(72) Inventor: Hiroshi Urase, Aichi (JP)

(73) Assignee: PANASONIC INTELLECTUAL PROPERTY MANGEMENT CO., LTD., Osaka (JP)

(*) Notice: Subject to any disclaimer, the term of this patent is extended or adjusted under 35 U.S.C. 154(b) by 270 days.

(21) Appl. No.: 14/375,118

(22) PCT Filed: Jan. 22, 2013

(86) PCT No.: PCT/JP2013/000267
§ 371 (c)(1),
(2) Date: Jul. 28, 2014

(87) PCT Pub. No.: WO2013/114809
PCT Pub. Date: Aug. 8, 2013

(65) Prior Publication Data
US 2015/0003205 A1 Jan. 1, 2015

(30) Foreign Application Priority Data

Jan. 31, 2012 (JP) ................................ 2012-018899

(51) Int. Cl.
G01S 1/72 (2006.01)
G01S 15/04 (2006.01)
G01S 7/527 (2006.01)

(52) U.S. Cl.
CPC ............... *G01S 15/04* (2013.01); *G01S 7/527* (2013.01)

(58) Field of Classification Search
CPC .................. G01S 15/04; G01S 7/527
See application file for complete search history.

(56) References Cited

U.S. PATENT DOCUMENTS 3,901,071 A * 8/1975 Hansen ................. G01B 17/02
  73/615
4,606,015 A * 8/1986 Yamaguchi ........... G01S 15/102
  367/107

(Continued)

FOREIGN PATENT DOCUMENTS

JP S54-59857 U 4/1979
JP 2006-234474 A 9/2006

(Continued)

OTHER PUBLICATIONS

European Office Action issued in European Patent Application No. 13743568.1, dated Oct. 16, 2015.

(Continued)

*Primary Examiner* — Steven Lim
*Assistant Examiner* — Kam Ma
(74) *Attorney, Agent, or Firm* — McDermott Will & Emery LLP (57) ABSTRACT

An ultrasound sensor includes a transmitting/receiving device configured to transmit/receive ultrasound waves; and a controller configured to make the transmitting/receiving device transmit an ultrasound burst wave, as each of the ultrasound waves, and detect an object through a reception signal that is output from the transmitting/receiving device. The controller is configured to shift operation mode to a detecting mode, when the object is detected in a monitoring mode. In the monitoring mode, the number of waves included in the ultrasound burst wave is changed in two stages. The detecting mode is of detecting the object, using the ultrasound burst wave having the waves that are being used at a time point when the object is detected in the monitoring mode.

8 Claims, 4 Drawing Sheets

(56) References Cited

U.S. PATENT DOCUMENTS

| | | | | |
|---|---|---|---|---|
| 4,991,146 A * | 2/1991 | Ransdell | ............... | G01S 7/523 367/909 |
| 5,207,101 A * | 5/1993 | Haynes | ............... | G01F 23/2962 73/290 V |
| 5,210,521 A * | 5/1993 | Hojell | ............... | B60Q 1/52 340/426.26 |
| 5,646,907 A * | 7/1997 | Maccabee | ............... | G01S 17/026 250/492.1 |
| 5,828,584 A * | 10/1998 | Oda | ............... | G01S 7/486 356/3.11 |
| 6,573,855 B1 * | 6/2003 | Hayakawa | ............... | G01S 13/88 342/176 |
| 7,000,476 B2 * | 2/2006 | Katayama | ............... | G01S 15/872 367/125 |
| 7,420,504 B1 * | 9/2008 | Held | ............... | G01S 13/22 342/134 |
| 8,510,990 B2 * | 8/2013 | Agam | ............... | G01S 15/04 49/26 |
| 8,651,376 B2 * | 2/2014 | Luo | ............... | G06K 7/10237 235/379 |
| 8,875,441 B2 * | 11/2014 | Agam | ............... | E05F 15/2023 49/26 |
| 9,318,022 B2 * | 4/2016 | Barth | ............... | G08G 1/141 |
| 9,348,026 B2 * | 5/2016 | Armbruster | ............... | G01S 15/025 |
| 2003/0047684 A1 * | 3/2003 | Riegl | ............... | F27D 21/0021 250/341.6 |
| 2003/0086077 A1 * | 5/2003 | Kayano | ............... | B60Q 1/10 356/121 |
| 2003/0151541 A1 * | 8/2003 | Oswald | ............... | B60R 21/01538 342/70 |
| 2004/0136270 A1 * | 7/2004 | Gal | ............... | G01S 7/52004 367/98 |
| 2005/0052950 A1 * | 3/2005 | Klinnert | ............... | G01S 7/52004 367/99 |
| 2006/0087415 A1 * | 4/2006 | Simonazzi | ............... | G01S 15/931 340/435 |
| 2007/0272019 A1 * | 11/2007 | Agam | ............... | B67D 1/124 73/628 |
| 2007/0291590 A1 * | 12/2007 | Harada | ............... | G01S 7/527 367/99 |
| 2009/0140842 A1 * | 6/2009 | Suzuki | ............... | G06K 7/0008 340/10.51 |
| 2010/0051689 A1 * | 3/2010 | Diamond | ............... | G06Q 20/04 235/380 |
| 2010/0227605 A1 * | 9/2010 | Fournier | ............... | H04L 63/123 455/419 |
| 2010/0286514 A1 * | 11/2010 | Leighton | ............... | G01S 7/292 600/437 |
| 2011/0026365 A1 * | 2/2011 | Beckhoven | ............... | G01S 7/524 367/137 |
| 2011/0044133 A1 * | 2/2011 | Tokita | ............... | G01S 7/52047 367/87 |
| 2011/0259106 A1 * | 10/2011 | Niemz | ............... | G01S 7/527 73/632 |
| 2012/0170411 A1 * | 7/2012 | Suzuki | ............... | G01S 15/878 367/99 |
| 2012/0223853 A1 * | 9/2012 | Shiba | ............... | G01S 13/726 342/90 |
| 2013/0142011 A1 * | 6/2013 | Hallek | ............... | G01S 7/527 367/87 |
| 2014/0097971 A1 * | 4/2014 | Barth | ............... | G01S 7/52004 340/932.2 |
| 2014/0331772 A1 * | 11/2014 | Klotz | ............... | G01S 7/527 73/602 |
| 2015/0003205 A1 * | 1/2015 | Urase | ............... | G01S 15/04 367/93 |
| 2015/0061915 A1 * | 3/2015 | Kishigami | ............... | G01S 7/023 342/27 |
| 2015/0109104 A1 * | 4/2015 | Fadell | ............... | G08B 27/003 340/5.65 |
| 2015/0198699 A1 * | 7/2015 | Kuo | ............... | G01S 7/52017 367/7 |
| 2015/0279134 A1 * | 10/2015 | Warren | ............... | G07C 9/00039 340/5.85 |
| 2015/0301173 A1 * | 10/2015 | Vangeel | ............... | G01S 15/04 315/158 |

FOREIGN PATENT DOCUMENTS

| | | | |
|---|---|---|---|
| JP | 2006234474 A | * | 9/2006 |
| JP | 2010-181208 A | | 8/2010 |

OTHER PUBLICATIONS

International Search Report issued in International Application No. PCT/JP2013/000267 with mailing date of May 7, 2013, with English Translation.

European Extended Search Report issued in European Patent Application No. 13743568.1. dated Oct. 16, 2015.

\* cited by examiner

ULTRASOUND SENSOR

RELATED APPLICATIONS

This is the national phase of International Application No. PCT/JP2013/000267, with an international filing date of Jan. 22, 2013, which claims priority of Japanese Patent Application No. 2012-018899, filed on Jan. 31, 2012, the contents of each of which are hereby incorporated by reference.

TECHNICAL FIELD

The invention relates to an ultrasound sensor, which is configured to detect an object, utilizing ultrasound waves.

BACKGROUND ART

Conventionally, there has been provided an ultrasound sensor, which is configured to determine presence or absence of an object in a detection area, and measure a distance to the object, using a time period from transmission of ultrasound waves to reception of waves reflected by the object.

This type of ultrasound sensor includes a transmitter configured to transmit ultrasound waves, and a receiver configured to receive ultrasound waves. Alternately, there has been provided an ultrasound sensor which includes a transmitting/receiving device that is used for both a transmitter and a receiver. The ultrasound sensor including the transmitting/receiving device is configured to drive the transmitting/receiving device with a transmission signal to transmit ultrasound waves to a detection area, and configured to detect reflected waves through a reception signal that is output from the transmitting/receiving device that has received ultrasound waves. Therefore, it is possible to determine presence or absence of an object in the detection area and measure a distance to the object, through measuring a time period from driving of the transmitting/receiving device with the transmission signal to detection of the reflected waves through the reception signal output from the transmitting/receiving device.

Because the transmitting/receiving device is used for transmission and reception of ultrasound waves, part of the transmission signal may turn to a circuit for detecting the reception signal. Furthermore, because the transmitting/receiving device vibrates mechanically when being driven with the transmission signal, reverberation may occur. For this reason, there has been proposed a configuration of setting a time period for detecting the reflected waves, when a time in which the sensor is not influenced by the reverberation comes, after driving of the transmitting/receiving device with the transmission signal. By adopting this configuration, it is possible to detect the reflected waves without the influence of the transmission signal and the reverberation (e.g., see JP2010-181208A).

Incidentally, attenuation of the reflected waves to the transmitted ultrasound waves is more increased, as a distance to an object to be detected is longer. Therefore, if energy of ultrasound waves to be transmitted is constant, amplitude of the reception signal is more reduced as the distance to the object to be detected is longer. From this, an increase in amplitude of ultrasound waves to be transmitted, or enhancement of reception sensibility for ultrasound waves can be considered, in order to more increase a distance at which the sensor can detect an object.

However, the increase in the amplitude of ultrasound waves to be transmitted causes a time period, during which the sensor is influenced by the reverberation, to be longer. Accordingly, it may cause a problem that the distance at which the sensor can detect an object is more reduced on a short-distance side. On the other hand, the enhancement of the reception sensibility causes an increase in a possibility of receiving ultrasound waves other than the waves reflected by the object. As a result, an S/N ratio becomes deteriorated, and it may cause a problem that erroneous detection easily occurs.

DISCLOSURE OF THE INVENTION

It is an object of the present invention to provide an ultrasound sensor which can detect an object over a wide distance range while suppressing erroneous detection that is caused by reception of unnecessary ultrasound waves.

An ultrasound sensor according to the present invention includes a transmitting/receiving device and a controller. The transmitting/receiving device is configured to transmit/receive ultrasound waves. The controller is configured to provide a transmission signal to the transmitting/receiving device to make the transmitting/receiving device transmit an ultrasound burst wave, as each of the ultrasound waves. The controller is configured to detect an object in a detection area to which the ultrasound waves are transmitted, through a reception signal that is output from the transmitting/receiving device. The transmitting/receiving device is configured to more increase amplitude of the reception signal, as the number of waves included in the received ultrasound burst wave is larger in a range where the amplitude of the reception signal is not saturated. The controller is configured to define, as a pulse number, the number of waves included in the ultrasound burst wave. The controller is configured to determine that the object is present, when a reception signal level is equal to or more than a threshold. The reception signal level is equivalent to the amplitude of the reception signal that corresponds to waves reflected by the object. The controller is configured to cyclically select the pulse number to be used from a plurality of pulse numbers that are set in stages, and detect the object with the pulse number being used when having determined that the object is present.

In the ultrasound sensor, preferably, the controller is configured to store at least a first pulse number and a second pulse number that is more than the first pulse number. In this case, the controller is preferably configured to operate in: a monitoring mode of transmitting/receiving the ultrasound burst wave while cyclically selecting the pulse number to be used from the first and second pulse numbers until preliminarily detecting presence of the object; or a detecting mode of transmitting/receiving the ultrasound burst wave with the pulse number, selected from the first and second pulse numbers, being used at a time point when having preliminarily detected the presence of the object.

In the ultrasound sensor, preferably, the monitoring mode in the controller includes: a first time period of transmitting/receiving the ultrasound burst wave repeatedly one or more times with the first pulse number in advance; and a second time period of transmitting/receiving the ultrasound burst wave repeatedly one or more times with the second pulse number after end of the first time period. In this case, preferably, when a sum of the first and second time periods is defined as a cycle, the controller is configured to repeat the cycle until preliminarily detecting the presence of the object.

In the ultrasound sensor, preferably, the controller is configured to determine that the object is present, when the reception signal level is equal to or more than the threshold in a prescribed reception period. In this case, preferably, the controller is configured to change the prescribed reception period according to the pulse number being used.

In the ultrasound sensor, preferably, the controller is configured to more reduce the threshold as a distance to the object is longer, when having determined that the object is present.

According to the configuration of the present invention, the distance to the object to be detected is determined by preliminarily detecting the object while changing the number of waves included in the ultrasound burst wave that is transmitted once, and then the object is detected by transmitting the ultrasound burst wave having proper number of waves. Therefore, it is possible to detect an object over a wide distance range while suppressing erroneous detection that is caused by reception of unnecessary ultrasound waves.

BRIEF DESCRIPTION OF THE DRAWINGS

Preferred embodiments of the present invention will now be described in further details. Other features and advantages of the present invention will become better understood with regard to the following detailed description and accompanying drawings where.

BEST MODE FOR CARRYING OUT THE INVENTION

Figure 1:
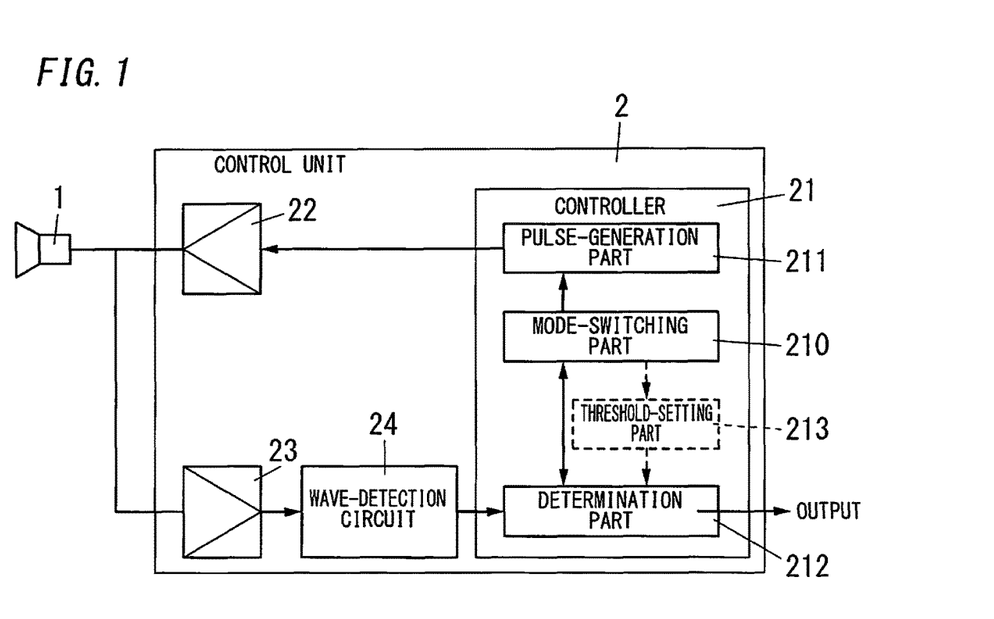
FIG. 1 is a block diagram illustrating an ultrasound sensor according to an embodiment.

As shown in FIG. 1, an ultrasound sensor of the present embodiment includes: a transmitting/receiving device 1 configured to transmit/receive ultrasound waves; and a control unit 2 configured to have a function of making the transmitting/receiving device 1 transmit the ultrasound waves and a function of detecting presence or absence of an object with an ultrasound wave that is received by the transmitting/receiving device 1. The transmitting/receiving device 1 includes for example a piezoelectric element (not shown), and is configured to be driven with a transmission signal including a high frequency component to output the ultrasound waves, and output a reception signal by receiving the ultrasound wave.

The control unit 2 has a function of generating the transmission signal to be provided to the transmitting/receiving device 1 and a function of detecting the presence or absence of the object based on the reception signal that has been output from the transmitting/receiving device 1. The control unit 2 includes a controller 21 that is a device, such as a microcomputer in which operation is controlled by a program.

Here, it is possible to handle the ultrasound sensor as a single component and make handling for the ultrasound sensor easy, by forming a recess in part of a housing (not shown) of the transmitting/receiving device 1 and storing, in the recess, a circuit substrate on which the control unit 2 is mounted. In the control unit 2, only the controller 21 may be mounted on another circuit substrate. In this case, it is possible to make the controller 21 perform a function other than the ultrasound sensor.

The controller 21 is configured to intermittently generate a rectangular wave including one or more pulses, and provide the generated rectangular wave, as the transmission signal, to the transmitting/receiving device 1 through an amplifier 22 that is provided in the control unit 2. That is, the transmitting/receiving device 1 is configured to not transmit, as a continuous wave, the ultrasound wave, but intermittently transmit, as a burst wave, the ultrasound wave. Here, a transmission interval between ultrasound waves being burst waves is appropriately set according to a distance to an object to be detected. The number of waves that are included in the ultrasound burst wave transmitted from the transmitting/receiving device 1 agrees with a pulse number, as the number of pulses that are included in the rectangular wave generated by the controller 21. Accordingly, hereinafter, the number of waves included in the ultrasound burst wave transmitted from the transmitting/receiving device 1 is referred to as a "pulse number".

The controller 21 is further configured to compare, with a threshold, a reception signal level that corresponds to amplitude of the reception signal output from the transmitting/receiving device 1, and determine that an object is present when the reception signal level is equal to or more than the threshold. The configuration and function of the control unit 2 will be detailed later.

Figure 6:
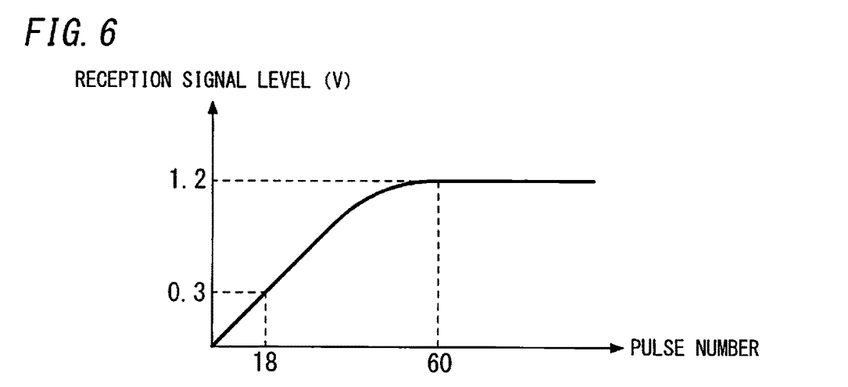
FIG. 6 is a drawing illustrating a relationship between a reception signal level and a pulse number in the ultrasound sensor according to the embodiment.

Incidentally, the ultrasound sensor of the present embodiment as described below is configured based on knowledge that when the pulse number in the ultrasound wave received by the transmitting/receiving device 1 is small, the amplitude of the reception signal output from the transmitting/receiving device 1 changes according to the pulse number. FIG. 6 shows one example of a relationship between the pulse number and the reception signal level being equivalent to the amplitude of the reception signal. That is, in a range where the pulse number is relatively small (range from 0 to about 60), the reception signal level is proportionally increased with an increase of the pulse number, but, in a range where the pulse number is relatively large (range where the pulse number exceeds 60), the reception signal level is saturated and becomes substantially constant. The example illustrated in FIG. 6 shows a relationship of the reception signal level to the pulse number included in an ultrasound wave, in a case where an object at a certain distance is detected with the ultrasound wave having a frequency (an inverse number of a period) of 72[kHz]. Data shown in FIG. 6 was measured in a state where a column having a diameter of 50[mm] was positioned at a distance of 3[m] from the transmitting/receiving device 1 so that the ultrasound wave was reflected by a lateral face of the column.

As a reason of the occurrence of the range where the reception signal level is proportionally increased according to the pulse number as described above, it can be considered that, when the pulse number is small, energy for exciting the transmitting/receiving device 1 is low and the reception signal level from the transmitting/receiving device 1 does not become maximum. In other words, it can be said that the reception signal level from the transmitting/receiving device 1 can be adjusted according to the pulse number included in the ultrasound wave, in a range where the reception signal level is not saturated.

From FIG. 6, it can be seen that the reception signal level is saturated and becomes substantially constant (1.2[V]) in the range where the pulse number in the ultrasound wave received by the transmitting/receiving device 1 exceeds about 60. Further, it can be seen that the reception signal level is proportionally increased with the increase of the pulse number in the range of the pulse number from 0 to about 60.

Incidentally, the pulse number in the ultrasound wave received by the transmitting/receiving device 1 agrees with that in the ultrasound wave transmitted. In addition, a period, during which the transmitting/receiving device 1 is driven for transmitting the ultrasound waves, is increased with an increase of the pulse number in the ultrasound wave received by the transmitting/receiving device 1. Accordingly, a period during which the ultrasound sensor is influenced by reverberation occurring by the transmitting/receiving device 1 is also increased. Therefore, it can be said that reducing of the pulse number is better, in order to reduce the period during which the ultrasound sensor is influenced by the reverberation and to enable detection of an object on a short-distance side.

On the other hand, the reception signal level is also reduced with the reducing of the pulse number. Accordingly, even if the reception signal level being equal to or more than the threshold can be secured for the object on the short-distance side, a maximum distance at which the ultrasound sensor can secure the reception signal level being equal to or more than the threshold becomes short. That is, a maximum distance at which the ultrasound sensor can detect the object becomes shorter, as the pulse number is smaller.

Now, it is assumed that the ultrasound sensor is used as a corner sonar or a back sonar of a vehicle, and a distance range of detecting an object is set to a range about from 0.5 to 1.5[m]. Further, it is assumed that the transmitting/receiving device 1 is used, from which a characteristic shown in FIG. 6 is obtained with respect to an object at a distance of 3[m]. Under this condition, to separate the reverberation from waves reflected by an object at the shortest distance, it is required that the influence of the reverberation disappears in a period that is shorter than about 0.003[s] after start of the transmission. In addition, it is required that the threshold for separating surrounding noises from the reflected waves is set to be more than 0.5[V] for example, and further the reception signal level for waves reflected by an object at the longest distance is equal to or more than the threshold.

Considering satisfaction of the above-mentioned requirements and a margin level corresponding to a difference in reflectance between objects, or the like, a lower limit of the pulse number is about 15 and an upper limit thereof is about 40 to 50. Regarding the influence of the reverberation, it is desirable to allow a sufficient margin level, and accordingly, it can be said that the pulse number of about 15 to 20 is desirable as a design condition.

In the example of FIG. 6, with respect to an object at a distance of 3[m], when the pulse number is set to 18, the reception signal level becomes 0.3[V]. Accordingly, with respect to an object at a distance of 1.5[m], the reception signal level is expected to become about 0.6[V]. That is, when the pulse number is set to 18, the maximum distance at which the ultrasound sensor can detect an object becomes 1.5[m] or more. When the pulse number is set to about 18, it can be considered that the period during which the ultrasound sensor is influenced by the reverberation is sufficiently shorter than 0.003[s]. Therefore, the minimum distance at which the ultrasound sensor can detect an object becomes 0.5[m] or less. That is, setting of the pulse number to 18 satisfies the above-mentioned distance range being 0.5 to 1.5[m].

Based on the knowledge described above, the present embodiment adopts a configuration of changing a pulse number included in an ultrasound wave to be transmitted according to a distance to an object. Accordingly, a monitoring mode and a detecting mode are provided. The monitoring mode is of preliminarily detecting the distance to the object by changing, in stages, the number of the ultrasound pulses. The detecting mode is of detecting the presence or absence of the object, based on the distance to the object obtained in the monitoring mode. One operation example in which the monitoring mode and the detecting mode are provided individually will be described below. However, the operation of detecting the presence or absence of the object may be adopted in the monitoring mode.

Figure 7:
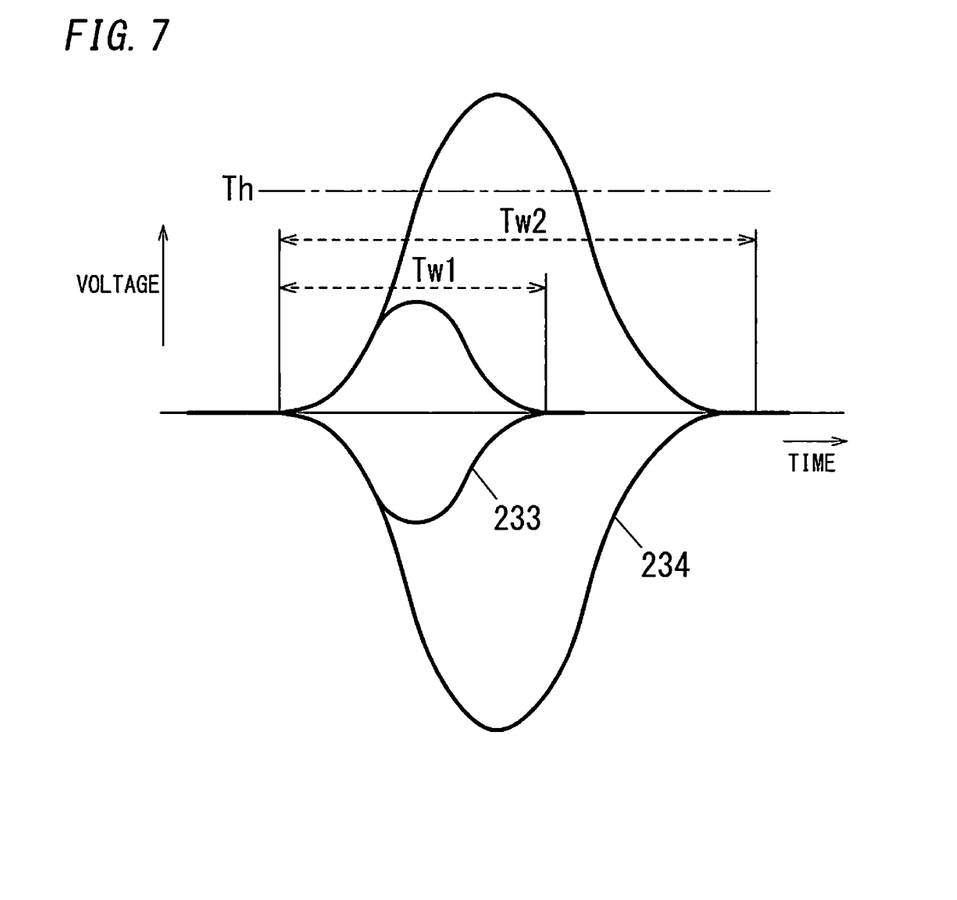
FIG. 7 is a drawing illustrating envelope signals in the ultrasound sensor according to the embodiment.

As shown in FIG. 1, the control unit 2 includes an amplifier 22 and an amplifier 23, in addition to the controller 21 described above. The amplifier 22 is configured to amplify the rectangular wave that is output from the controller 21. The amplifier 23 is configured to amplify the reception signal that is output from the transmitting/receiving device 1. Further, the control unit 2 in the illustrated example includes a wave-detection circuit 24, which is configured to extract an envelope signal that is equivalent to an envelope of the reception signal amplified by the amplifier 23. In the present embodiment, the transmitting/receiving device 1 is used for transmission and reception of ultrasound waves, and accordingly, part of the transmission signal output from the amplifier 22 may turn to the amplifier 23. In FIG. 7, envelope signals output from the wave-detection circuit 24 are illustrated. As above, when pulse numbers in ultrasound waves to be transmitted are different, the period during which the ultrasound sensor is continuously influenced by the reverberation occurring by the transmitting/receiving device 1 is changed, and also the reception signal level is changed. For example, an envelope signal 233 is obtained when the pulse number is 18 and an envelope signal 234 is obtained when the pulse number is 60, where those envelope signals are extracted under the same condition as FIG. 6, using the transmitting/receiving device 1 having the characteristic shown in FIG. 6.

From the illustrated example, it can be seen that a duration period Tw1 of the envelope signal 233 when the pulse number is 18 is sufficiently shorter than a duration period Tw2 of the envelope signal 234 when the pulse number is 60. That is, the period during which the ultrasound sensor is continuously influenced by the reverberation becomes shorter, as the pulse number is smaller. In addition, as illustrated in FIG. 6, the reception signal level is proportionally increased according to the pulse number, in the range of the pulse number from 18 to 60. Accordingly, the reception signal level (a peak value of the envelope signal) becomes higher, as the pulse number is larger.

The controller 21 includes a pulse-generation part 211 and a determination part 212. The pulse-generation part 211 is configured to generate the rectangular wave to be provided to the amplifier 22. The determination part 212 is configured to obtain a peak value of the envelope signal (the reception signal level) input from the wave-detection circuit 24, and compare the reception signal level with a predetermined threshold. The determination part 212 is configured to determine, when detecting the reception signal with the level being equal to or more than the threshold in a prescribed reception period that is set after transmission of ultrasound waves, that the object is present in a detection area defined by the reception period, and output a signal of indicating the presence of the object. Further, the controller 21 includes a mode-switching part 210, which is configured to select the operation mode from the monitoring mode and the detecting mode. The mode-switching part 210 is configured to instruct the pulse-generation part 211 to change the pulse number included in the ultrasound wave according to the operation mode, and further instruct the determination part 212 to change the reception period according to the operation mode or the pulse number being used.

The pulse-generation part 211 is configured to cyclically select the pulse number to be used from a plurality of pulse numbers that are set in stages, in the monitoring mode. Hereinafter, a case of cyclically selecting from pulse numbers that are set in two stages is described, as an example. However, the pulse number to be used may be selected from pulse numbers that are set in three stages or more. The smaller of the pulse numbers set in two stages, which the pulse-generation part 211 selects the pulse number to be used from, is referred to as a first pulse number, and the larger is referred to as a second pulse number. Regarding the period during which the ultrasound sensor is continuously influenced by the reverberation after transmission of ultrasound waves, the period in a state where the first pulse number is being used is shorter than the period in a state where the second pulse number is being used. Therefore, the reception period is set on a short-distance side in the state where the first pulse number is being used, and on a long-distance side in the state where the second pulse number is being used.

Figure 2:
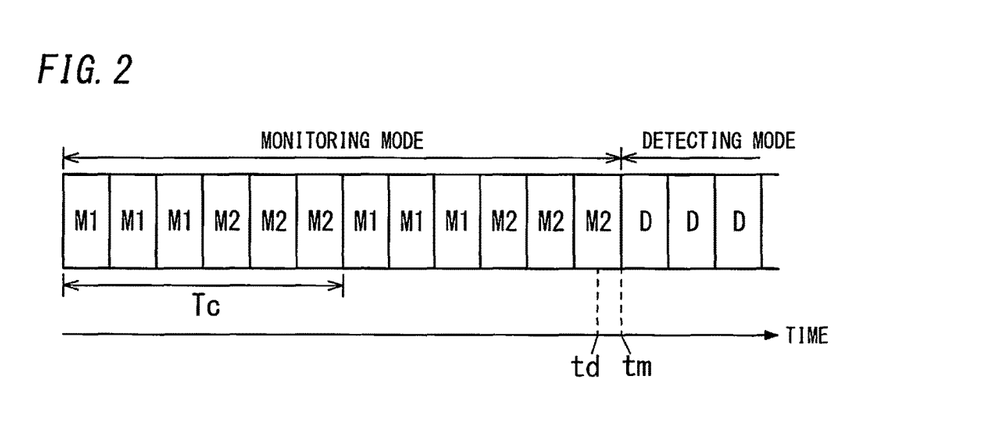
FIG. 2 is an explanatory drawing for operation of the ultrasound sensor according to the embodiment.

As shown in FIG. 2, the monitoring mode includes: a time period (first time period) of continuously performing an operation M1 repeatedly plural times, where the operation M1 is of transmitting/receiving an ultrasound wave with the first pulse number; and a time period (second time period) of continuously performing an operation M2 repeatedly plural times after end of the first time period, where the operation M2 is of transmitting/receiving an ultrasound wave with the second pulse number. In the monitoring mode, when a sum of the first and second time periods is defined as a time period Tc of a cycle, operation for each cycle is repeatedly performed until the object is detected. In the illustrated example, a time period of performing the operation M1 three times and the operation M2 three times is assigned for the operation for each cycle in the monitoring mode. However, the number of times each of the operations M1 and M2 is continuously performed may be set appropriately.

On the other hand, in the detecting mode, operation of detecting the object is performed, using the reception period and the pulse number being used at a time point when the object has been detected in the monitoring mode. Accordingly, the pulse number and reception period suitable for the detection area where the object is present are selected in the detecting mode. That is, it is possible to securely detect the presence or absence of the object and the distance to the object under the condition that the ultrasound sensor is hardly influenced by the reverberation and noises.

The illustrated example of FIG. 2 shows a case where the object is detected at a time td in the monitoring mode, and the cycle in which the object is detected is completed at a time tm. Therefore, the mode-switching part 210 selects the detecting mode at the time tm, and an operation D is performed, using the pulse number and reception period corresponding to an operation M2 at the time point when the object has been detected in the monitoring mode. In the detecting mode, the operation D of transmitting and receiving an ultrasound wave is continuously performed to detect the presence or absence of the object and the distance to the object. Then, when the detection state is shifted to a state where the object is not detected after the distance to the object is reported, the mode-switching part 210 selects the monitoring mode again.

Even when the monitoring mode is shifted to the detecting mode, there is a case where no object is detected even once. Accordingly, it is preferred that the number of times of the operation D is limited (for example, 20 times). That is, after the operation mode is shifted to the detecting mode, the mode-switching part 210 is configured to select the monitoring mode again, if no object is detected even when the operation D is performed prescribed times.

As above, the distance to the object is preliminarily detected in the monitoring mode of cyclically selecting an ultrasound wave to be used from ultrasound waves having different pulse numbers to transmit/receive the ultrasound wave, and then, in the detecting mode, operation for detecting the object is tried again, using the condition that the object has been detected. Therefore, it is possible to detect the object under a proper condition. That is, it is possible to select the pulse number and reception period to be used from a plurality of options, so as to reduce the influence of the reverberation when the distance to the object is short, and so as to increase energy of ultrasound waves to be transmitted when the distance to the object is long. As a result, it is possible to detect an object over a wide distance range while suppressing the possibility of erroneous detection.

Figure 3:
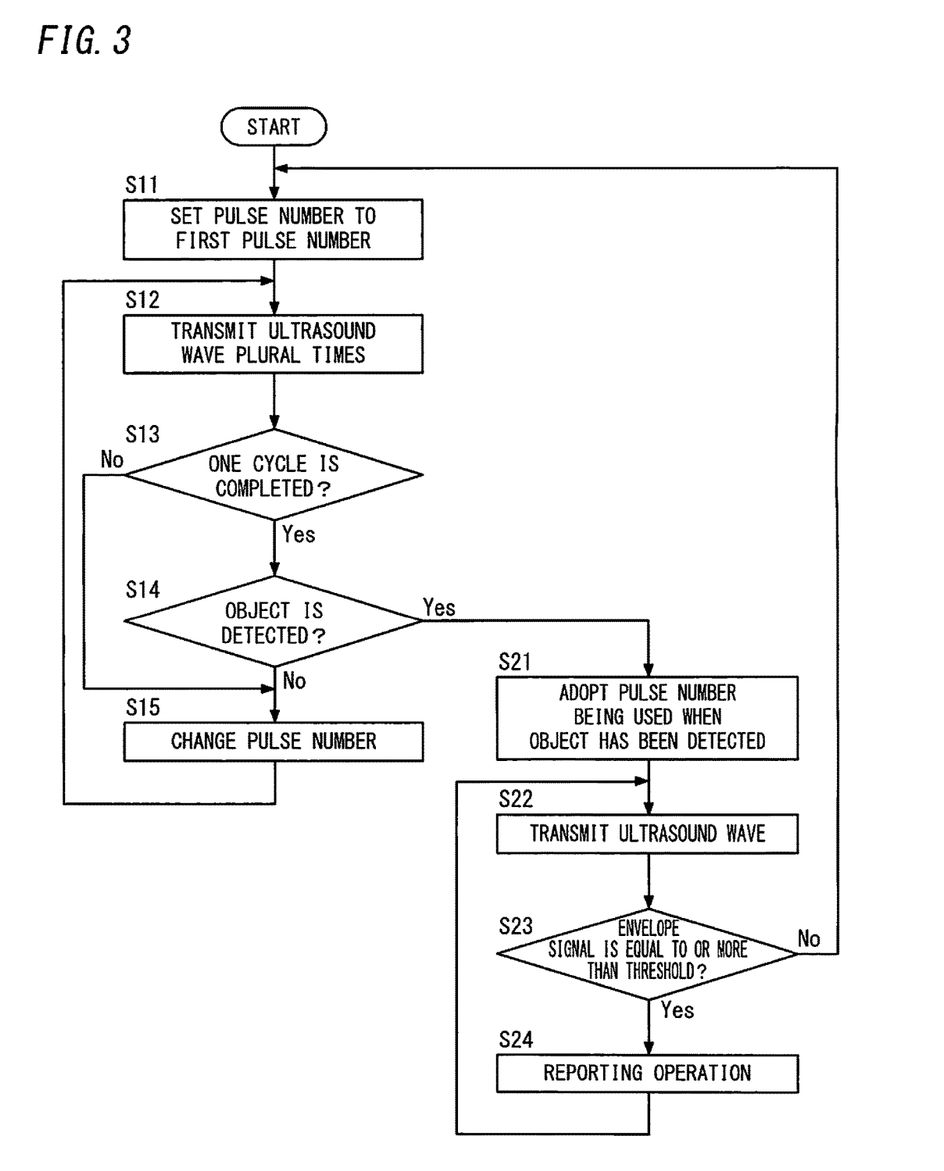
FIG. 3 is a flow chart for the operation of the ultrasound sensor according to the embodiment.

A summary of operation of the controller 21 is shown in FIG. 3. When the ultrasound sensor starts operation, the mode-switching part 210 selects the monitoring mode. That is, the pulse-generation part 211 sets the pulse number to the first pulse number (S11), and outputs the rectangular wave having the first pulse number to make the transmitting/receiving device 1 transmit ultrasound waves (S12). In this case, an ultrasound wave with the first pulse number is continuously transmitted a plurality of times (three times in the above-mentioned example). Then, the pulse-generation part 211 changes the pulse number to the second pulse number (S15), and outputs the rectangular wave having the second pulse number to make the transmitting/receiving device 1 transmit ultrasound waves (S12). Also, an ultrasound wave with the second pulse number is continuously transmitted a plurality of times (three times in the above-mentioned example). This operation is repeated until one cycle in the monitoring mode is completed (S13).

During one cycle in the monitoring mode, the determination part 212 compares the reception signal level with the threshold, and determines that the object is detected when the reception signal level is equal to or more than the threshold. That is, in the monitoring mode, if by a time point of completion of each cycle (S13: Yes) the determination part 212 determines that the object is detected (S14: Yes), the operation mode is shifted to the detecting mode. If by the time point of the completion of one cycle no object is detected, the pulse-generation part 211 changes the pulse number to the first pulse number again (S15), and the above-mentioned operation is repeated.

In the detecting mode, the pulse-generation part 211 adopts the pulse number being used at a time point when the object has been detected in the monitoring mode (S21). Further, the determination part 212 adopts the reception period being used at the time point when the object has been detected in the monitoring mode. The pulse-generation part 211 outputs the rectangular wave having the adopted pulse number to make the transmitting/receiving device 1 transmit ultrasound waves (S22). Then, if the envelope signal (reception signal level) is equal to or more than the threshold (S23: Yes), the determination part 212 determines that the object is detected, and outputs a reporting signal (S24), and then steps of S22 to S24 are repeated until the reception signal level is reduced below the threshold (that is, until the detection state is shifted to a state where the object is not detected). If the reception signal level does not exceed the threshold (S23: No), it is determined that no object is detected. Then, the processing is returned to the monitoring mode, and the first pulse number is set (S11).

In the flow chart of FIG. 3, for simplifying of the constitution, the ultrasound sensor is configured so that the processing is immediately returned to the monitoring mode (S11), if no object is detected through operation of transmitting/receiving a first ultrasound wave when the operation mode is shifted from the monitoring mode to the detecting mode. However, similarly to FIG. 2, the operation of transmitting/receiving the ultrasound wave and the threshold determination (S22 to S23) may be performed repeatedly prescribed times without the processing being immediately returned to the monitoring mode (S11), even if no object is detected after the operation mode is shifted to the detecting mode. In this case, if no object is detected even when the operation and the determination are performed the prescribed times, the processing is again returned to the monitoring mode (S11).

The reporting signal is used for sounding a buzzer, or lighting up a report lamp. In a case where the determination part 212 has a function of calculating a distance to an object, the reporting signal may include information relating to the distance to the object.

Figure 4:
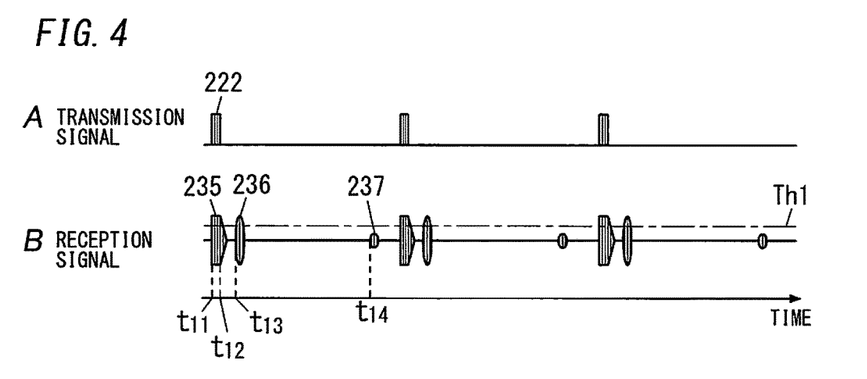
FIG. 4 is an explanatory drawing, including A and B, for the operation of the ultrasound sensor according to the embodiment.
Figure 5:
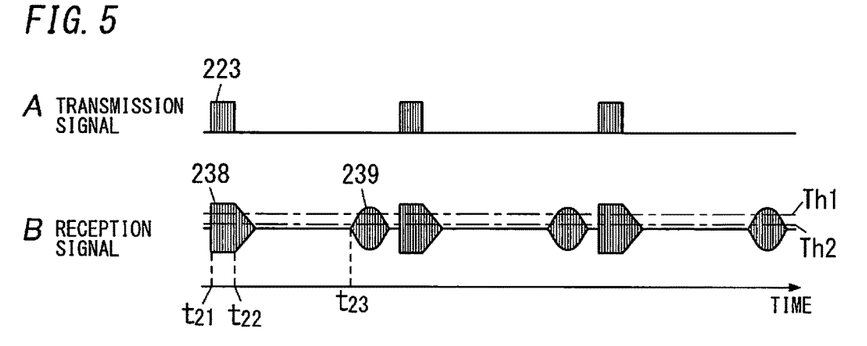
FIG. 5 is an explanatory drawing, including A and B, for the operation of the ultrasound sensor according to the embodiment.

Hereinafter, operation example in which the first pulse number is 2 is shown in FIGS. 4A and 4B, and operation example in which the second pulse number is 60 is shown in FIGS. 5A and 5B. The operations in FIGS. 4A, 4B, 5A and 5B are performed in common to both of the monitoring mode and the detecting mode.

As shown in FIGS. 4A and 4B, it is assumed that a transmission signal 222 is provided, at a time t11, to the transmitting/receiving device 1 in a time period when the first pulse number is being used. In this case, a signal 235 is input to the amplifier 23 at the time t11, where the signal 235 is obtained by combination of a signal, as part of the transmission signal that turns to the amplifier 23, and a signal being equivalent to the reverberation that occurs by the transmitting/receiving device 1. In the illustrated example, part of the signal 235 that follows after a time t12 is a component equivalent to the reverberation, where the time t12 is equivalent to a time point when the transmission signal 222 is stopped.

In a case where an object is present at a relatively short distance, after the transmission of the transmission signal 222, a reception signal 236 is received at a time t13 for example. Because this reception signal 236 corresponds to a wave reflected by the object at the short distance, the reception signal level corresponding to the reception signal 236 is relatively high. The illustrated example shows that the reception signal level corresponding to the reception signal 236 is equal to or more than a threshold Th1 that is set in the determination part 212. That is, the presence of the object is detected.

On the other hand, in a case where an object is present at a relatively long distance, a reception signal 237 is received at a time t14 after the time t13, for example. Because this reception signal 237 corresponds to a wave reflected by the object at the long distance, the reception signal level corresponding to the reception signal 237 is relatively low. The illustrated example shows that the reception signal level corresponding to the reception signal 237 does not exceed the threshold Th1 set in the determination part 212. That is, the presence of the object is not detected despite the object being actually present.

As shown in FIGS. 5A and 5B, it is considered that a transmission signal 223 is provided, at a time t21, to the transmitting/receiving device 1 in a time period when the second pulse number is being used. In this case, similarly to the time period when the first pulse number is being used, a signal 238 is input to the amplifier 23 at the time t21, where the signal 238 is obtained by combination of a signal, as part of the transmission signal that turns to the amplifier 23, and a signal being equivalent to the reverberation that occurs by the transmitting/receiving device 1. Part of the signal 238 that follows after a time t22 is a component equivalent to the reverberation.

In the operation in FIGS. 5A and 5B, a period between a point of transmission of the transmission signal 223 being started and a point of the reverberation being stopped is longer, compared with the operation in FIGS. 4A and 4B. Accordingly, it is hard to set the reception period to detect the object being present at a relatively short distance. However, regarding a wave reflected by the object being present at a relatively long distance, a reception signal 239 having relatively large amplitude is received by the above-mentioned principle, at a time t23 for example, as illustrated. In the illustrated example, because the reception signal level corresponding to this reception signal 239 exceeds the threshold Th1, it is possible to detect the object.

Here, it is assumed that a period between a starting point of transmission of the transmission signal 222 and the time t14 is equal to a period between a starting point of transmission of the transmission signal 223 and the time t23. That is, when the second pulse number is being used, it is possible to detect the object at the long distance, which is impossible to be detected when the first pulse number is being used. On the other hand, regarding the object on the short-distance side, it is possible to detect it when the first pulse number is being used.

As described above, because, in the monitoring mode, the controller 21 is configured to switch the first pulse number which is small and the second pulse number which is large, it is possible to determine the pulse number required for detecting the object. In addition, by using, in the detecting mode, the pulse number determined in the monitoring mode, the object can be detected easily, and as a result, the possibility of erroneous detection can be suppressed. Furthermore, because the pulse number is selected according to the distance to the object, it is possible to detect an object over a wide distance range.

Now, it is assumed that a pulse number of 18 is suitable for detecting an object within a detection area of about 0.5 to 1.5[m] when using the transmitting/receiving device 1 having the characteristic shown in FIG. 6. Here, when the pulse number is set to 60 as the above-mentioned operational example, it is possible to extend the maximum distance at which the ultrasound sensor can detect an object to a range of 5 to 8[m], for example. As shown in FIG. 7, it is highly likely that, in the envelope signal 234 when the pulse number is 60, a signal level thereof exceeds the threshold Th even in a case of a distance at which, in the envelope signal 233 when the pulse number is 18, a signal level thereof does not exceed the threshold Th. That is, it is possible to extend the maximum distance at which the ultrasound sensor can detect an object to three times or more, without changing of the threshold Th.

In the above-mentioned operational example, the threshold in the determination part 212 is kept constant regardless of the pulse number. However, the threshold may be changed according to the pulse number. That is, as shown by a broken line in FIG. 1, the controller 21 may further include a threshold-setting part 213, which is configured to select the threshold in the determination part 212 according to changing of the pulse number. As a threshold Th2 in FIGS. 5A and 5B, the threshold-setting part 213 is configured to select the threshold Th2 instead of the threshold Th1 when selecting the second pulse number. The threshold Th2 is set to be less than the threshold Th1. It is possible to detect, when receiving a wave reflected by an object that is present at a long distance, the presence of the object even if the reception signal level is low. That is, it is easy to detect the object that is present at the long distance. It is preferred that the threshold Th2 is set, for both of the monitoring mode and detecting mode, in the determination part 212. However, the threshold Th2 may be adopted for only the detecting mode. In addition, a configuration that the threshold is increased when the pulse number is small may be adopted, instead of the configuration that the threshold is reduced when the pulse number is large.

In the above-mentioned configuration example, the function of the controller 21 is realized by executing a program. However, the function of the controller 21 may be realized by hardware. In the above-mentioned embodiment, the operation is adopted, where the operation mode is shifted to the detecting mode when an object is detected once during one cycle in the monitoring mode. However, an operation may be adopted, where the operation mode is shifted to the detecting mode when the object is detected a plurality of times during one cycle. In the above-mentioned embodiment, each of the first pulse number and the second pulse number is selected three times, during one cycle in the monitoring mode. However, the number of times of this selection may be appropriately set, and may be set to one time for example. Further, in the monitoring mode, an operation may be adopted, where the operation mode is shifted to the detecting mode at a time point when an object is detected, without waiting for end of one cycle. Further, the monitoring mode may function also as the detecting mode, without the operation mode being shifted from the monitoring mode to the detecting mode, and a detection result for an object in the monitoring mode may be adopted as it is.

Although the present invention has been described with reference to certain preferred embodiments, numerous modifications and variations can be made by those skilled in the art without departing from the true spirit and scope of this invention, namely claims.

The invention claimed is:

1. An ultrasound sensor, comprising:
a transmitting/receiving device configured to transmit/receive ultrasound waves; and
a controller configured to provide a transmission signal to the transmitting/receiving device to make the transmitting/receiving device transmit an ultrasound burst wave, as each of the ultrasound waves, and to detect an object in a detection area to which the ultrasound waves are transmitted, through a reception signal that is output from the transmitting/receiving device, wherein:
the transmitting/receiving device is configured to more increase amplitude of the reception signal, as a number of waves included in the received ultrasound burst wave is larger in a range where the amplitude of the reception signal is not saturated,
the controller is further configured to:
define, as a pulse number, the number of waves included in the ultrasound burst wave,
preliminary determine whether the object is present by cyclically selecting the pulse number to be used from a plurality of pulse numbers that are set in stages, and by determining that the object is present when a reception signal level is equal to or more than a threshold, the reception signal level being equivalent to the amplitude of the reception signal that corresponds to waves reflected by the object, and
when the object is detected in the preliminary determination, adopt the pulse number by which the object is preliminary determined to be present, and detect the object again by using the adopted pulse number.

2. The ultrasound sensor according to claim 1,
wherein the controller is further configured to:
store at least a first pulse number and a second pulse number that is more than the first pulse number, and
operate in:
a monitoring mode of transmitting/receiving the ultrasound burst wave while cyclically selecting the pulse number to be used from the first and second pulse numbers until preliminarily detecting presence of the object; or
a detecting mode of transmitting/receiving the ultrasound burst wave with the pulse number, selected from the first and second pulse numbers, being used at a time point when having preliminarily detected the presence of the object.

3. The ultrasound sensor according to claim 2,
wherein the monitoring mode in the controller includes:
a first time period of transmitting/receiving the ultrasound burst wave repeatedly one or more times with the first pulse number in advance; and
a second time period of transmitting/receiving the ultrasound burst wave repeatedly one or more times with the second pulse number after end of the first time period, and
wherein when a sum of the first and second time periods is defined as a cycle, the controller is further configured to repeat the cycle until preliminarily detecting the presence of the object.

4. The ultrasound sensor according to claim 1,
wherein the controller is configured to:
determine that the object is present, when the reception signal level is equal to or more than the threshold in a prescribed reception period, and
change the prescribed reception period according to the pulse number being used.

5. The ultrasound sensor according to claim 1,
wherein the controller is further configured to more reduce the threshold as a distance to the object is longer, when having determined that the object is present.

6. The ultrasound sensor according to claim 2,
wherein the controller is further configured to more reduce the threshold as a distance to the object is longer, when having determined that the object is present.

7. The ultrasound sensor according to claim 3,
wherein the controller is further configured to more reduce the threshold as a distance to the object is longer, when having determined that the object is present.

8. The ultrasound sensor according to claim 4, wherein the controller is further configured to more reduce the threshold as a distance to the object is longer, when having determined that the object is present.

\* \* \* \* \*